(12) United States Patent
Imaoka et al.

(10) Patent No.: US 12,000,051 B2
(45) Date of Patent: Jun. 4, 2024

(54) SLIDING MEMBER, METHOD FOR MANUFACTURING SAME, AND METHOD FOR MANUFACTURING HARD MATERIAL

(71) Applicant: DAIDO METAL COMPANY LTD., Nagoya (JP)

(72) Inventors: Soushi Imaoka, Inuyama (JP); Manae Mori, Inuyama (JP); Yuma Haneda, Inuyama (JP)

(73) Assignee: DAIDO METAL COMPANY LTD., Aichi (JP)

( * ) Notice: Subject to any disclaimer, the term of this patent is extended or adjusted under 35 U.S.C. 154(b) by 0 days.

(21) Appl. No.: 17/905,067

(22) PCT Filed: Mar. 9, 2021

(86) PCT No.: PCT/JP2021/009102
§ 371 (c)(1),
(2) Date: Aug. 26, 2022

(87) PCT Pub. No.: WO2021/182423
PCT Pub. Date: Sep. 16, 2021

(65) Prior Publication Data
US 2023/0111221 A1    Apr. 13, 2023

(30) Foreign Application Priority Data
Mar. 10, 2020  (JP) ................. 2020-040947

(51) Int. Cl.
*C23C 2/26* (2006.01)
*C23C 18/08* (2006.01)
(52) U.S. Cl.
CPC .............. *C23C 2/265* (2013.01); *C23C 18/08* (2013.01)

(58) Field of Classification Search
None
See application file for complete search history.

(56) References Cited

U.S. PATENT DOCUMENTS

| 10,428,700 B2 | 10/2019 | Ikemi et al. |
| 2002/0026855 A1 | 3/2002 | Sakai et al. |
| 2003/0126800 A1* | 7/2003 | Seth ................. F01D 11/12 51/293 |

(Continued)

FOREIGN PATENT DOCUMENTS

| JP | 04-123260 U | 4/1992 |
| JP | 07-238331 A | 9/1995 |

(Continued)

OTHER PUBLICATIONS

JPH07238331, machine translation, 1995. (Year: 1995).*
International Search Report for PCT/JP2021/009102 dated May 25, 2021.

*Primary Examiner* — Seth Dumbris
(74) *Attorney, Agent, or Firm* — BROWDY AND NEIMARK, PLLC

(57) ABSTRACT

In a sliding member, fatigue resistance of a surface layer formed by dispersing a hard material in a soft metal matrix is improved. A sliding member includes a base material layer and a surface layer, the surface layer includes a metal matrix and a hard material harder than the matrix and dispersed in the matrix, the hard material has a gradient in hardness, and the gradient in hardness gradually decreases from an inner side to a surface of the hard material.

6 Claims, 3 Drawing Sheets

(56) References Cited

U.S. PATENT DOCUMENTS

2004/0229077 A1    11/2004   Mori et al.
2009/0130425 A1*   5/2009   Whitaker ................. B32B 5/16
                                                                                   428/312.8
2016/0333932 A1*   11/2016   Iwata ................... B32B 27/281
2019/0169822 A1*   6/2019   Montross ................ C22C 29/02

FOREIGN PATENT DOCUMENTS

| JP | 07238331 A | * | 9/1995 |
| JP | 2002266079 A | | 9/2002 |
| JP | 2009215569 A | | 9/2009 |
| JP | 4749260 B2 | | 8/2011 |

* cited by examiner (A)

(B)

(C)

SLIDING MEMBER, METHOD FOR MANUFACTURING SAME, AND METHOD FOR MANUFACTURING HARD MATERIAL

TECHNICAL FIELD

The present invention relates to an improvement in a sliding member, a method for manufacturing the same, and a method for manufacturing a hard material.

BACKGROUND ART

A sliding member generally includes a base material layer and a surface layer, and a member to be slid is supported by the surface layer. In many cases, the surface layer is formed of a soft metal material for securing slidability.

Since a surface layer formed of a soft metal material has a problem in abrasion resistance thereof, it has been studied to disperse a hard substance (hard material) in the surface layer to improve abrasion resistance by the hard material.

However, when there is a large difference in hardness between a metal matrix that constitutes the surface layer and the hard material dispersed in the metal matrix, stress concentration is likely to occur at the interface between the metal matrix and the hard material. As a result, the hard material may fall off from the metal matrix of the surface layer. In a case where the difference in hardness between the hard material and the metal matrix is large, when an external force applied to the surface layer is transmitted to the hard material through the metal matrix, the external force is repelled from the hard surface of the hard material, and the external force is concentrated at the interface with the relatively soft metal matrix. As a result, the structure of the metal matrix may collapse at the interface, and the hard material may fall off.

Accordingly, it has been proposed to relax such stress concentration by covering a hard material with a material having intermediate hardness between the hard material and a metal matrix (see Patent Document 1). When the hard material is covered with a material having intermediate hardness as described above, a part of the stress is absorbed by the covering material, so that it is possible to prevent the stress from concentrating at the interface with the metal matrix. Accordingly, the structure of the interface of the metal matrix is prevented from being collapsed, thereby falling off of the hard material is prevented, and the fatigue resistance of the sliding member is eventually improved.

CITATIONS LIST

Patent Documents
  Patent Document 1: JP H07-238331 A

SUMMARY OF INVENTION

Technical Problems

As represented by start-stop of an automobile engine and miniaturization thereof, there is a tendency that a load on the sliding member increases with the evolution of an internal combustion engine.

Accordingly, the sliding member is required to meet a further tough request, that is, to improve fatigue resistance thereof while securing the slidability by the metal matrix.

Here, according to the technique proposed in Patent Document 1, it is possible to prevent a hard material from falling off by covering the hard material with a relatively soft metal, but a higher fall prevention effect is required of the sliding member in recent years.

Further, in the technique proposed in Patent Document 1, since a hard material is covered with a metal film, the particle diameter of the hard material increases. According to Examples of Patent Document 1, the covering metal layer has a film thickness of at least 15 μm. On the other hand, the film thickness of a surface layer of a sliding member used in an automobile engine is generally about several to several tens of μm. Accordingly, a hard material having a size as proposed in Patent Document 1 cannot be used in such a thin surface layer. This is because the hard material is exposed from the surface layer, and softness required of the surface layer is inhibited.

Solutions to Problems

As a result of intensive studies to solve the above problems, the present inventors have found that the surface itself of a hard material should be softened. Since the surface itself of the hard material is softened, it is not necessary to cover the hard material with another metal film as proposed in Patent Document 1. This makes it possible to prevent an increase in diameter of the hard material.

A first aspect of the present invention is defined as follows. That is, a sliding member comprising a base material layer and a surface layer, wherein the surface layer includes a metal matrix and a hard material harder than the matrix and dispersed in the matrix, the hard material has a gradient in hardness, and the gradient in hardness gradually decreases from an inner side to a surface of the hard material.

In the sliding member of the first aspect defined as above, since there is a gradient in hardness and the gradient gradually decreases from an inner side toward a surface of the hard material, the original hard portion remains in the inner side of the hard material itself. Thus, the function of imparting abrasion resistance to the surface layer, which is originally required of hard materials, is secured. Since the hard material is softened on the surface side, the difference in hardness at the interface with the metal matrix can be reduced. Accordingly, stress concentration at the interface is relaxed, and the hard material is prevented from falling off from the metal matrix. This improves the fatigue resistance of the sliding member.

FIG. 1 schematically illustrates a sliding member 1 of the present invention.

The sliding member 1 includes a base material layer 3 made of a metal material such as a steel material and a surface layer 5 formed on the base material layer. The surface layer 5 has a configuration in which a hard material 7 is dispersed in a soft metal matrix 6.

FIG. 2 illustrates a conceptual diagram of the hard material 7.

In this example, the hard material 7 is divided into two regions, that is, hard region A that is relatively hard and soft region B that is relatively soft. According to a third aspect described later, hard region A has a concentration of the second metal material of less than or equal to 9%, and soft region B has a concentration of the second metal material exceeding 9%. In the drawing, the symbol "X" represents an interface between the two regions.

A second aspect of the present invention is defined as follows.

In the sliding member defined in the first aspect, the hardness of the surface of the hard material is equal to a hardness of the metal matrix.

In the sliding member defined as above, stress concentration at the interface between the hard material and the metal matrix can be reliably prevented. Here, the phrase "the hardness is equal" means that the stress applied to the interface is substantially uniformly distributed in both (the surface of the hard material and the metal matrix), and includes a case where a difference in physical parameters indicating hardness lies between the both.

A third aspect of the present invention is defined as follows. That is, in the sliding member defined in the first or second aspect, the hard material includes a first metal material and a second metal material, the second metal material is softer than the first metal material, a concentration of the second metal material has a gradient, and the gradient in the concentration gradually increases from an inner side toward the surface of the hard material.

In the sliding member of the third aspect defined as above, a gradient is provided in the concentration of the soft second metal material. Accordingly, the gradient in hardness defined in the first aspect is obtained.

Note that the presence of a third metal material as a material for forming the hard material is not denied. The concentration distribution of the third metal material is not particularly limited as long as the gradient in hardness defined in the first aspect is secured by the concentration distribution of the first metal material and the second metal material. Similarly to the second metal material, the third metal material is also preferably softer than the first metal material and has the same concentration distribution as that of the second metal material (the concentration gradient gradually increases from an inner side toward a surface of the hard material).

A fourth aspect of the present invention is defined as follows. That is, in the third aspect, a material of the metal matrix is identical or of an identical kind to a material of the second metal material.

This makes it easy to make the hardness of the surface of the hard material equal to the hardness of the metal matrix. Further, the hard material rich in the second metal material at the surface thereof is improved in adhesion to a metal matrix made of an identical or identical kind of metal, and is more reliably prevented from falling off. Here, the identical kind of metal refers to an alloy containing an identical metal element, for example.

A fifth aspect of the present invention is defined as follows. That is, in the sliding member defined in the third or fourth aspect, in the hard material, an area rate of a region where a rate of the second metal material is less than or equal to 9% by mass is greater than or equal to 1% and less than or equal to 35%.

In the sliding member defined in the fifth aspect defined as above, there is 1 to 35% of hard region A in which the rate of the second metal material is less than or equal to 9% by mass. Accordingly, hardness required of a hard material for maintaining abrasion resistance is secured. Meanwhile, the other region in which the rate of the second metal material exceeds 9% by mass serves as soft region B. Since soft region B is present at the surface of the hard material in an appropriate amount, a part of external force P applied to the surface layer is absorbed by soft region B as illustrated in FIG. 3(B). Accordingly, stress concentration at the interface between the hard material 7 and the metal matrix 6 is effectively prevented.

On the other hand, when the area rate of the region where the rate of the second metal material is less than or equal to 9% by mass (that is, hard region A) is less than 1%, hard region A is small as illustrated in FIG. 3(A). Accordingly, there is a tendency that the abrasion resistance performance imparted to the surface layer is deteriorated as compared with the configuration illustrated in FIG. 3(B).

Further, when the area rate of a region where the rate of the second metal material is less than or equal to 9% by mass (that is, hard region A) exceeds 35%, hard region A is large as illustrated in FIG. 3(C). As a result, external force P applied to the surface layer in hard region A is repelled and tends to concentrate at the interface with the metal matrix. That is, as compared with the configuration illustrated in FIG. 3(B), there is a tendency that the function of preventing the stress concentration at the interface decreases.

Here, the rate of the second metal material represents mass percent, %, by mass obtained by a widely used elemental analysis method.

Further, the area rate of the region can be determined as follows.

A pixel is virtually set in the cross section of the hard material, elemental analysis is performed for each pixel, and the number of pixels in which the rate of the second metal material is within the above range (less than or equal to 9% by mass) is counted. The ratio between the number of pixels and the total number of pixels that constitute the hard material is defined as the area rate.

A sixth aspect of the present invention is defined as follows. That is, in the sliding member defined in the fifth aspect, a distance from the surface of the hard material to the region where the rate of the second metal material is less than or equal to 9% by mass is greater than or equal to 0.07 μm.

In the sliding member defined in the sixth aspect defined as above, it is meant that soft region B, that is, the region where the rate of the second metal material exceeds 9% by mass, is present with a thickness of greater than or equal to 0.07 μm on the surface side of the hard material (see FIG. 4). By securing soft region B, it is possible to more reliably prevent stress from concentrating at the interface between the hard material and the metal matrix.

A method for measuring distance L from the surface of the hard material 7 to the predetermined region will be described in detail in the section of the embodiment.

Note that it is more preferable that the thickness of soft region B be uniform over the entire hard material. In other words, hard region A is positioned at the center of the hard material. Accordingly, stress applied to the hard material from all directions can be uniformly relaxed.

A seventh aspect of the present invention is defined as follows.

A method for manufacturing a sliding member including a base material layer and a surface layer, the method comprising:

a layer forming step of forming a precursor layer of the surface layer on the base material layer, wherein particles of a first metal material harder than a metal matrix are dispersed in the metal matrix; and a temperature-increasing step of increasing a temperature of the precursor layer to diffuse a material of the metal matrix into the particles of the first metal material.

In the manufacturing method of the seventh aspect defined as above, in the temperature-increasing step, atoms of the relatively soft metal matrix diffuse into the particles of the first metal material. The degree of diffusion is controlled by adjusting the temperature and the time. Accordingly, the diffusion amount of the metal matrix is large on the surface side of the particles of the first metal material, and the diffusion amount of the metal matrix is small inside the particle. That is, when the material of the diffused metal matrix is regarded as the second metal material, in a particle form of the hard material including the first metal material, a gradient is formed in the concentration of the second metal material softer than the first metal material, and the gradient in the concentration gradually increases from an inner side toward a surface of the hard material.

An eighth aspect of the present invention is defined as follows. That is, in the manufacturing method defined in the seventh aspect, in the precursor layer forming step, a second metal material as a metal material of the metal matrix and the first metal material are simultaneously plated to disperse the particles of the first metal material in the second metal material, and after the precursor layer is formed and before the temperature-increasing step is performed, a third metal material forming step of forming a third metal material is further performed. Here, the third metal material is a metal different from the first and second metal materials, and diffusible into both the first and second metal materials by a temperature increase.

In the manufacturing method of the eighth aspect defined as above, it is not necessary to separately prepare the particles made of the first metal material. Accordingly, a step of dispersing such particles in the metal matrix is unnecessary, and the manufacturing process is simplified.

In the above, the first metal material and the second metal material do not substantially form a solid solution. Here, the phrase "do not form a solid solution" means that the two metals are not mixed by merely bringing into contact and heating the two metal material. Further, it is meant that even when both the metal materials are ionized and formed as a layer (that is, even when both the materials are plated) on the same surface, both the materials are not mixed.

Meanwhile, the third metal material can form a solid solution together with the first metal material and the second metal material.

A ninth aspect of the present invention is defined as follows. That is, in the manufacturing method defined in the eighth aspect, the third metal material is softer than the first metal material.

In the manufacturing method of the ninth aspect defined as above, since the third metal material is also softer than the first metal material, the third metal material easily provides the gradient in the concentration of the soft metal material in the first metal material together with the second metal material.

A tenth aspect of the present invention relates to a method for manufacturing a hard material used in the present invention. That is, a method for manufacturing a hard material including a first metal material and a second metal material, wherein the second metal material is softer than the first metal material, a concentration of the second metal material has a gradient, and the gradient in the concentration gradually increases from an inner side toward a surface of the hard material, the method comprising:

bringing the particles of the first metal material into contact with a molten of the second metal material.

The concentration distribution of the second metal material in the hard material formed of the particles of the first metal material can be controlled by adjusting the contact conditions (temperature, time, and stirring). Examples of the contact mode include immersion and pouring of a molten metal material.

An eleventh aspect of the present invention is defined as follows. That is, a method for manufacturing a hard material including a first metal material, a second metal material, and an inorganic porous body, wherein the second metal material is softer than the first metal material, a concentration of the second metal material has a gradient, and the gradient in the concentration gradually increases from an inner side toward a surface of the hard material, the method comprising:

immersing the inorganic porous body in a molten of the first metal material, and then bringing the inorganic porous body into contact with a molten of the second metal material to diffuse the second metal material into the first metal material.

In the method for manufacturing a hard material of the eleventh aspect defined as above, the inorganic porous body serving as a skeleton of the hard material is first immersed in a molten of the first metal material to make the first metal material adsorb the inorganic porous body. Accordingly, particles of the first metal material incorporating the inorganic porous body therein are obtained. Thereafter, the second metal material is diffused into the particles by bringing the particles into contact with a molten of the second metal material. Then, the concentration distribution of the second metal material diffused into the first metal material that constitutes the hard material can be controlled by adjusting the contact conditions (temperature, time, and stirring). Examples of the contact mode include immersion and pouring of a molten metal material.

A twelfth aspect of the present invention is defined as follows. That is, a method for manufacturing a sliding member using a hard material obtained by the method according to the tenth or eleventh aspect, the method comprising:

a step of providing a base material layer; and a plating step of forming a metal matrix material on a surface of the base material layer by plating, wherein when the plating step is performed, the hard material is engulfed in bubbling air in a plating bath.

By using the manufacturing method defined as above, the hard material can be uniformly dispersed in the metal matrix.

DESCRIPTION OF EMBODIMENT

Figure 1:
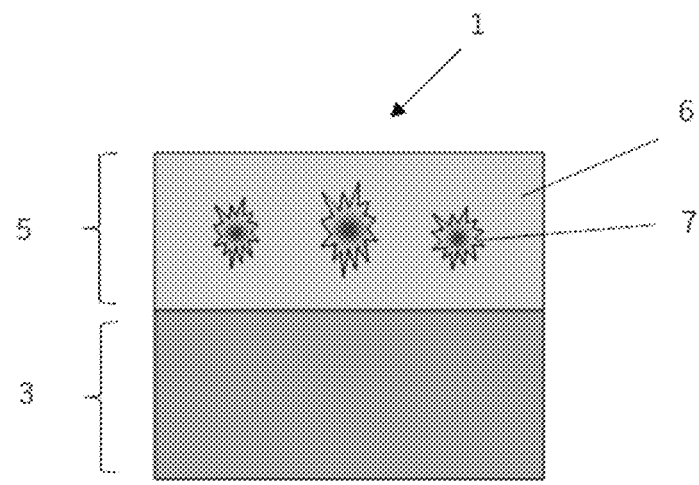
FIG. 1 is a schematic diagram of a sliding member of the present invention.

Hereinafter, the present invention will be described in more detail with reference to an embodiment.

A base material layer that constitutes a sliding member is generally made of a metal material.

In a bearing as an example of the sliding member, a base material layer has a configuration in which a copper-based bearing alloy layer is formed on a back metal layer made of a steel material. An intermediate layer made of Ag or Ni, for example, may be formed on the bearing alloy layer.

The surface layer that constitutes the sliding member has a soft metal as a matrix, and a hard substance is dispersed in the metal matrix.

Examples of the material of the metal matrix include indium (In), tin (Sn), lead (Pb), bismuth (Bi), and antimony (Sb). The metal matrix has a thickness of 1 μm to 50 μm.

The average particle diameter of the hard material dispersed in the metal matrix can be 0.2 μm to 50 μm. A preferable average particle diameter is shorter than the film thickness of the surface layer and is 1 μm to 5 μm. In addition, the blending amount of the hard material with respect to the metal matrix is preferably 0.5 to 60.0% by volume. The blending amount is more preferably 5.0 to 40.0% by volume.

The average particle diameter, the blending amount, and the quality of material of the hard material can be appropriately selected according to the use of the sliding member.

The hard material dispersed in the surface layer has a gradient in hardness, and the gradient in hardness gradually decreases from the inner side toward the surface.

By gradually decreasing the hardness, the external force applied to the surface layer can be efficiently absorbed. In other words, when the change in the hardness is stepwise in the radial direction, it is not preferable because the external force may be repelled at the interface where the hardness changes. Further, it takes time and effort to provide a stepwise hardness change in a minute hard material.

By gradually changing the quality of material (chemical property) of the hard material, a continuous gradient in hardness can be imparted to the hard material. In addition, it is also possible to impart a gradient in hardness to the hard material by gradually changing the physical property of the hard material.

In order to gradually change the quality of material of the hard material, a material that is softer than the material of the base material that constitutes the hard material is diffused from the surface of the particles serving as the base material. Accordingly, in the particles made of a material whose quality is hard, a diffusion state of the soft material in which the concentration of the soft material gradually increases from the inner side toward the surface is obtained. As a method of diffusing the soft material, it is preferable to diffuse the soft material into the material of the base material by bringing the soft material and the base material into contact with each other under a high-temperature condition (the base material is solid, and the soft material is liquid). In addition, diffusion can also be achieved by physically injecting the fine particles of the latter into the former.

In the hard material, the gradient in hardness may be formed in the entire hard material or a part of the hard material. Further, the gradient in hardness may be uniform or non-uniform as viewed from the center of the hard material. Here, the term "uniform" means that hardnesses at an equal distance as viewed from the center are the same.

Even when a gradient in hardness is formed in the entire hard material, since the unique role of the hard material is to improve abrasion resistance, a portion maintaining original hardness is required of the hard material. In this specification, such a portion is referred to as hard region A, and for example, when a hard material is made of a first metal material having its original hardness and a relatively soft second metal material, a region in which the rate of the second metal material to the entire hard material is less than or equal to 9% by mass is referred to as hard region A.

When hard region A occupies a predetermined size in the hard material, an original abrasion resistance function can be imparted to the hard material. The size to be occupied by hard region A can be appropriately selected according to on the hardness of hard region A itself or the use of the sliding member, for example.

In this specification, the proportion of hard region A is defined with an area rate in a desired cross section, and it is preferable that the area rate be greater than or equal to 1%. A method of calculating the area rate is not particularly limited, but for example, a pixel is virtually set in a desired cross section of a hard material, elemental analysis is performed for each pixel, and the number of pixels in which the rate of the second metal material is within the above range (less than or equal to 9% by mass) is counted. The ratio between the number of counted pixels and the number of entire pixels of the hard material is taken as the area rate.

From such a viewpoint, the area rate of hard region A is more preferably greater than or equal to 20%.

When the rate of hard region A in the hard material is too large, that is, when the area rate of hard region A is too large, the stress relaxation function is affected, and thus, in the present invention, the area rate of the hard region is preferably less than or equal to 355.

From such a viewpoint, the area rate of hard region A is more preferably less than or equal to 30%.

In order to make a change to the quality of material of the hard material, the hard material is preferably formed of two or more kinds of metal materials. It is assumed that the first metal material has a hardness originally required of the hard material. A material softer than the first metal material is selected as the second metal material, and is infiltrated into the particles made of the first metal material from the surface side, thereby forming the gradient of a concentration (that is, the gradient of the hardness) of the second metal material.

Here, as the first metal material, metals such as copper (Cu), silver (Ag), manganese (Mn), and nickel (Ni), or alloys of these metals can be used. The first metal material is harder than the material of the metal matrix.

As the second metal material, a material that is softer than the first metal material and diffusible into the first metal material is selected. Examples of the second metal material include metals such as In, Sn, Pb, Bi, Sb, and Zn, and alloys of these metals.

In addition to the first and second metal materials, a third component can also be added to the hard material.

A third metal material can be added as the third component. The third metal material may diffuse into the first metal material or the second metal material, or may exist alone.

An inorganic material may be added as the third component. For example, by incorporating porous silica in the hard material, the heat resistance of the hard material is improved.

Figure 2:
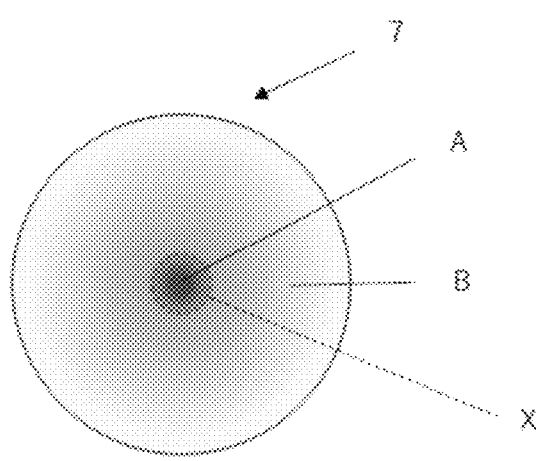
FIG. 2 is a schematic diagram illustrating a hard material of the present invention.
Figure 3:
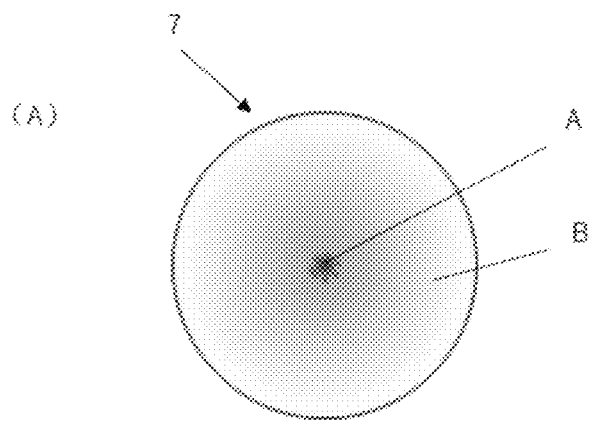
FIG. 3 is a schematic diagram illustrating a relationship between a ratio of hard region A to soft region B in the hard material and characteristics thereof.
Figure 3:
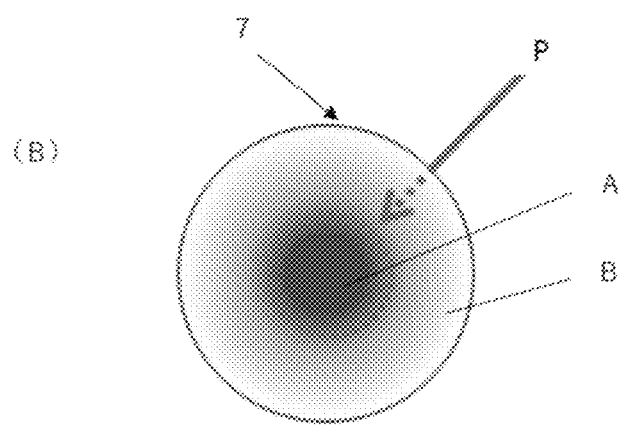
Figure 3:
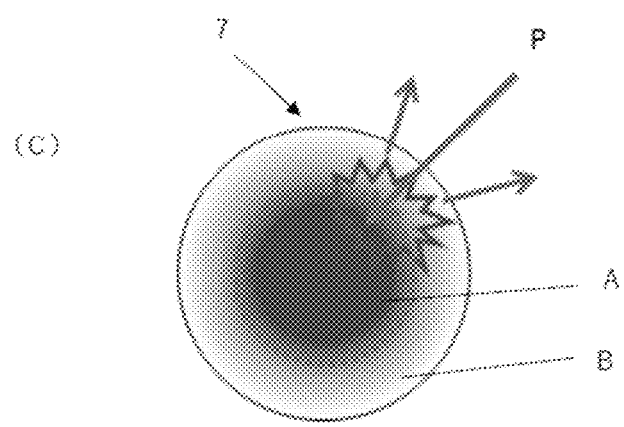
Figure 4:
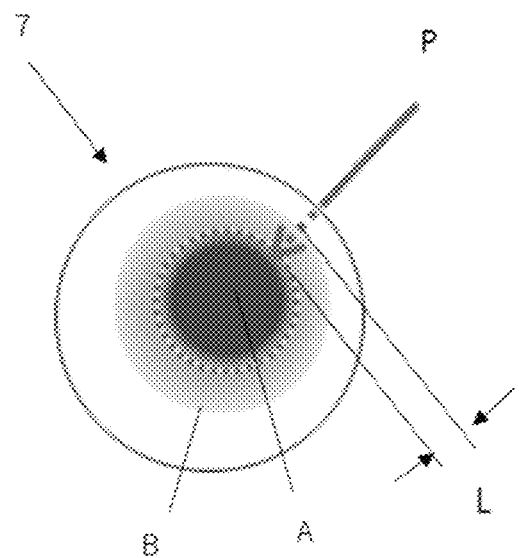
FIG. 4 is a schematic diagram illustrating a relationship between a distance from a surface of the hard material to hard region A and characteristics thereof.
Figure 4:
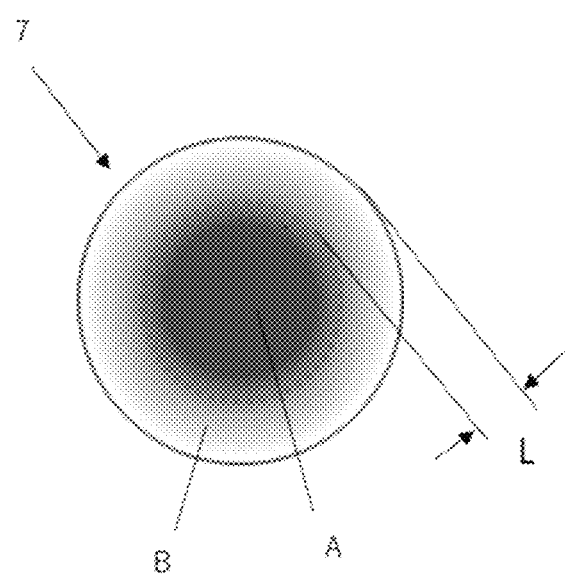

The shape of the hard material can also be arbitrarily selected. The shape is not limited to the spherical shape as illustrated in FIG. 2, and an elliptical spherical shape or a rod shape can also be adopted.

Hereinafter, a method for forming a surface layer on a base material layer will be described.

<Method of Preparing Particles with Gradient in Hardness, i.e. Hard Material, Separately from Metal Matrix>

Particles made of a first metal material harder than a metal matrix are prepared.

A molten in which the second metal material is melted is prepared. The second metal material can form a solid solution with the first metal material and is softer than the first metal material. The molten of the second metal material is maintained at a predetermined temperature, the particles of the first metal material are immersed in the molten, and the molten is stirred by a predetermined method for a predetermined time. Accordingly, the second metal material diffuses from the surface of the particles made of the first metal material to the inside thereof, and particles having a concentration gradient, that is, particles having a gradient in hardness in the second metal material, in other words, a hard material is obtained.

When the metal matrix is formed on the surface of the base material layer by electrolytic plating, by forcibly supplying the hard material to the base material layer side, the hard material is taken into and dispersed in the metal matrix.

In the above, a porous inorganic material such as porous silica can be incorporated in the hard material as a third material. In this case, by immersing the porous inorganic material in a molten of the first metal material, the particles of the first metal material incorporating the porous inorganic material are prepared in advance, and as described above, the particles are immersed in a molten of the second metal material.

<Method for Forming Eutectoid of Hard Material in Metal Matrix>

A first metal material (for example, Cu) that secures hardness of a hard material and a second metal material (for example, Bi) that is softer than the first metal material and does not form a solid solution with the first metal material are prepared. The second metal material serves as a metal matrix.

Using the first metal material and the second metal material as plating sources, electrolytic plating is simultaneously performed on the surface of the base material layer. Since both the metal materials do not form a solid solution, in the formed plating layer (the precursor layer of the surface layer), by adjusting the plating conditions (methanesulfonic acid bath, Cu concentration in the bath (g/L), the bath temperature, current density, and the storage period from completion of bath adjustment to use for plating), a particle form of the first metal material is dispersed in the second metal material as a matrix.

The ratio between the first metal material and the second metal material can be arbitrarily designed according to characteristics required of the sliding member, but for example, a volume ratio of the first metal material:the second metal material of 1:1.5 to 1:10 is preferred.

A layer of a third metal material (for example, Sb) capable of forming a solid solution with the first metal material and the second metal material is formed by electrolytic plating on the precursor layer as obtained above.

The ratio between the third metal material and (first metal material+second metal material) can be arbitrarily designed according to the characteristics required of the sliding member, but for example, a volume ratio of the former (third metal material):the latter (first metal material+second metal material) of 1:3 to 1:15 is preferred.

When the temperature of the layered product is increased to a predetermined temperature and maintained for a predetermined time, owing to the third metal material, the second metal material is diffused together with the third metal material into the particle form of the first metal material. Accordingly, the hard material is dispersed in the metal matrix made of the second metal material. Since the hard material is a material in which the second metal material and the third metal material that are relatively soft are diffused from the surface side of the hard first metal material, in the hard material, the second metal material and the third metal material that are softer than the first metal material are diffused with a gradient of a concentration in the first metal material, and the gradient of the concentration gradually increases from the inner side toward the surface. Here, the third metal material is also preferably softer than the first metal material.

In the above description, the metal matrix and other layers are formed by electrolytic plating, but these layers can also be formed by a sputtering method or other methods.

EXAMPLES

The sliding members of the examples had a cross-sectional structure illustrated in FIG. 1, for example. More specifically, a copper-based bearing alloy layer was lined on a steel back metal to produce a bimetal, and the bimetal was formed into a semi-cylindrical shape or a cylindrical shape. Thereafter, the surface of the bearing alloy layer was subjected to boring to finish the surface. Next, the surface of the semi-cylindrical or cylindrical formed product was cleaned (electrolytic degreasing and acid cleaning). In this manner, a base material layer 3 (thickness: 1.5 mm) was formed.

A surface layer (about 15 μm) was formed on the upper surface of the base material layer 3 obtained as described above.

The surface layer of Examples 1 to 3 was formed as follows.

Particles (average particle diameter: 3.6 μm) made of the first metal material were prepared, immersed in a molten made of the second metal material in a liquid form for 1 hour, and stirred. As a result, the second metal material was diffused into the particles made of the first metal material. Note that the average particle diameter of the particles formed of the first metal material is based on a catalog from a material provider (material manufacturer) (the same is applies hereinafter).

When the metal matrix material was electrolytically plated on the base material layer, the hard material obtained as described above was supplied to a portion near the base material layer. The supply method is a method of engulfing the hard material in the supplied air when the plating bath is bubbled.

Note that, in Comparative Examples 1 to 3, alloy particles made of the first metal material and the second metal material were prepared, and the alloy particles were engulfed in the same manner as described above when the metal matrix material was electrolytically plated.

The surface layers of Examples 4 to 9 were prepared as follows.

A Cu plating source, a Bi plating source, and an Sb plating source were prepared as the first metal material, the second metal material, and the third metal material, respectively.

Electrolytic plating was performed using both the Cu plating source and the Bi plating source with the surface of the base material layer as a surface to be plated.

In this manner, a precursor layer (13 μm) of the surface layer was formed on the surface of the base material layer. In the precursor layer, Cu particles formed a eutectoid with Bi as a metal matrix. Cu and Bi had a volume ratio of Cu:Bi=7:13.

Next, an Sb layer (2 μm) was formed on the surface of the precursor layer using the Sb plating source.

The layered product obtained as described above was heat-treated under the conditions shown in Table 2.

It goes without saying that the heat treatment can be arbitrarily selected according to the material to be selected and the conditions required of the surface layer.

In the layered product whose temperature is increased by the heat treatment, Sb is diffused into the precursor layer, and concentrated on Cu in a particle form and diffused into Cu. This is because Sb has better compatibility (higher reactivity) with Cu than Bi does. It is considered that when Sb diffuses into Cu particles, surrounding Bi is engulfed. As a result, as shown in Table 1, Bi was diffused, in addition to Sb, in the Cu particles.

In Comparative Example 4-1, alloy particles made of Cu, Bi, and Sb were prepared, and a surface layer was formed in the same manner as in Comparative Examples 1 to 3 by using Bi and Sb as plating sources.

In Comparative Example 4-2, heating was performed under the same conditions as in Example 4 (140° C.×5 hours (in air)) in a state where Sb was not formed on the precursor layer. Diffusion of the Bi material into the hard material made of Cu was not observed.

Table 1 shows the test results of the sliding members of Examples and Comparative Examples.

Further, from the results of Examples 4 and 5 and Examples 6 to 9, when the area rate of a hard region is 1 to 35%, the fatigue resistance is improved.

Furthermore, comparison between Example 6 and Example 9 illustrates that when distance L from the surface of the hard material to hard region A is greater than or equal to 0.07 μm, the fatigue resistance is improved.

In Table 1, the area rate of hard region A was determined as follows.

First, the interface between the base material layer and the surface layer was identified.

The cross section of the sliding member was observed with an electron microscope. Ten measurement points were set at equal intervals along the sliding direction on the outermost surface of the sliding member, and ten vertical lines perpendicular to the outermost surface were drawn from the points. Next, the length to a point where each vertical line intersects the base material layer, that is, the thickness of the surface layer was measured, and the average

TABLE 1

| | Material of surface layer | | | | | Characteristics of hard material | | | Fatigue resistance of sliding member |
| | Material of hard material | | | Inorganic porous material | Material of metal matrix | Hard material infiltration | | Hard region A | Hard region A | Maximum contact pressure (MPa) |
| | First metal material | Second metal material | Third metal material | | | Immersion treatment | Heat treatment | Area rate (%) | Distance (μm) | |
|---|---|---|---|---|---|---|---|---|---|---|
| Example 1 | Cu | In | | | Bi | yes | — | — | — | 80 |
| Comparative Example 1 | Cu | In | | | Bi | no | — | — | — | 60 |
| Example 2 | Cu | Sn | | | Sn | yes | — | — | — | 70 |
| Comparative Example 2 | Cu | Sn | | | Sn | no | — | — | — | 50 |
| Example 3 | Cu | Pb | | porous silica | Pb, In, Cu | yes | — | — | — | 125 |
| Comparative Example 3 | Cu | Pb | | porous silica | Pb, In, Cu | no | — | — | — | 100 |
| Example 4 | Cu | Bi | Sb | | Sb, Bi | — | yes | 0.7 | 0.05 | 110 |
| Comparative Example 4-1 | Cu | Bi | Sb | | Sb, Bi | — | no | — | — | 90 |
| Comparative Example 4-2 | Cu | Bi | | | Bi | — | yes | 100 | 0 | 90 |
| Example 5 | Cu | Bi | Sb | | Sb, Bi | — | yes | 50 | 0.05 | 110 |
| Example 6 | Cu | Bi | Sb | | Sb, Bi | — | yes | 20 | 0.05 | 115 |
| Example 7 | Cu | Bi | Sb | | Sb, Bi | — | yes | 1 | 0.05 | 115 |
| Example 8 | Cu | Bi | Sb | | Sb, Bi | — | yes | 35 | 0.05 | 115 |
| Example 9 | Cu | Bi | Sb | | Sb, Bi | — | yes | 19 | 0.07 | 120 |

TABLE 2

| | Infiltration heat treatment conditions | | |
| | Treatment temperature | Treatment time | Environment |
|---|---|---|---|
| Example 4 | 140° C. | 5 hours | in the atmosphere |
| Example 5 | 160° C. | 20 hours | in the atmosphere |
| Example 6 | 160° C. | 10 hours | in the atmosphere |
| Example 7 | 160° C. | 5 hours | in the atmosphere |
| Example 8 | 160° C. | 15 hours | in the atmosphere |
| Example 9 | 170° C. | 15 hours | in the atmosphere |

In Table 1, the hard materials of Examples 1 to 4 having a gradient in hardness have improved fatigue resistance as compared with the hard materials of Comparative Examples 1 to 4 having no gradient in hardness.

of the measured values was calculated. At this time, when any of the measured thicknesses of the surface layer was greater than or equal to ±5% of the average, the value was excluded as an abnormal value, and the average was calculated again.

The abnormal value mainly appeared when the quality of material of the base material and the quality of material of the hard material in the surface layer were similar. When the hard material is in contact with the base material layer, the hard material may be recognized as the roughness of the surface of the base material layer. For convenience of the measurement method, such a case has to be detected as an abnormal value. In this way, the interface between the base material layer and the surface layer was identified, and then the area rate of the region where the concentration of the second metal material was less than or equal to 9% (that is, hard region A) was calculated.

Elemental analysis was performed on the range of the surface layer in which the base material layer and the interface were identified. For elemental analysis, JXA-8530F Field Emission Electron Probe Microanalyzer (manufactured by JEOL Ltd.) was used. The resolution of elemental analysis was 0.05 μm×0.05 μm for one pixel. Next, the concentration of the second metal material was divided into three sections, and a region having a concentration of 100 to 95% (region of metal matrix), a region having a concentration of less than 95% and greater than 9% (soft region B), and a region having a concentration of 9 to 0% (hard region A) were detected. The area rate of the region having a concentration of the second metal material of 9 to 0% (that is, hard region A) was calculated by the following calculation formula.

> Area rate of region having concentration of second metal material of 9 to 0% (that is, hard region A) in hard material=(area of region having second metal material concentration of 9 to 0% (that is, hard region A)×100)/(area of region having concentration of less than 95% to greater than 9% (that is, soft region B)+region having concentration of 9 to 0% (area of hard region A)

Here, the area corresponds to the number of pixels.

In Table 1, the distance from the surface of the hard material to hard region A was determined as follows.

An interface between a region having a Bi concentration of 100 to 95 (region of metal matrix) and a region having a Bi concentration of less than 95% to greater than 9% (soft region B) was subjected to image analysis, and the interface was defined as a hard material first interface. The hard material first interface is defined as a surface of the hard material. Similarly, an interface between a region having a concentration of less than 95% to greater than 9% (that is, soft region B) and a region having a concentration of 9 to 0% (that is, hard region A) is detected, and the interface is defined as the hard material second interface.

Next, the distance from the first interface to the second interface of the hard material is measured, and the minimum value among them is defined as the distance from the surface of the hard material to the region where the concentration of the second metal material is 9 to 0% (that is, hard region A).

The fatigue resistance strength is determined as follows.

A test is performed under the following conditions to evaluate fatigue resistance.

Bearing inner diameter: 53 mm
Bearing width: 15 mm
Rotation speed: 3250 rpm
Lubricating oil: VG22
Quality of shaft material: S55C
Test time: 20 hours In the test, the contact pressure was increased by 5 MPa, and the maximum contact pressure at which no crack occurred was used as an evaluation value.

The maximum contact pressure is a value of the contact pressure immediately before a crack occurs in the sliding surface. When a crack occurs in the surface layer of the sample surface, it is determined that the sample is fatigued.

The present invention is not limited to the description of the embodiment of the invention described above. Various modifications that can be easily conceived by those skilled in the art without departing from the scope of the claims are also included in the present invention. A device including a bearing mechanism, such as an internal combustion engine including the sliding member of the present invention, exhibits good sliding characteristics.

The invention claimed is:

1. A sliding member comprising a base material layer and a surface layer,
   wherein the surface layer includes a metal matrix and a hard material harder than the matrix and dispersed in the matrix, the hard material has a continuous gradient in hardness with the gradient in hardness gradually decreasing from an inner side to a surface of the hard material.

2. The sliding member according to claim 1, wherein the hardness of the surface of the hard material is equal to a hardness of the metal matrix.

3. The sliding member according to claim 1, wherein the hard material includes a first metal material and a second metal material, the second metal material is softer than the first metal material, a concentration of the second metal material has a gradient, and the gradient in the concentration gradually increases from an inner side toward the surface of the hard material.

4. The sliding member according to claim 3, wherein a material of the metal matrix is identical or of an identical kind to a material of the second metal material.

5. The sliding member according to claim 3, wherein in the hard material, an area rate of a region where a rate of the second metal material is less than or equal to 9% by mass is greater than or equal to 1% and less than or equal to 35%.

6. The sliding member according to claim 5, wherein in the hard material, a distance from the surface of the hard material to the region where the rate of the second metal material is less than or equal to 9% by mass is greater than or equal to 0.07 μm.

\* \* \* \* \*